United States Patent [19]
Horton

[11] Patent Number: 5,815,069
[45] Date of Patent: Sep. 29, 1998

[54] BICYCLE THEFT PREVENTION SYSTEM

[75] Inventor: Douglas R. Horton, Merriam, Kans.

[73] Assignee: P B Deals, Inc., Kans.

[21] Appl. No.: 933,890

[22] Filed: Sep. 19, 1997

[51] Int. Cl.$^6$ ................................................. B60R 25/10
[52] U.S. Cl. ..................... 340/427; 340/432; 340/426;
340/568; 307/10.2
[58] Field of Search ................................. 340/425.5, 427,
340/432, 568, 571, 426, 572, 825.49; 70/233.34;
307/10.2, 10.1, 9.1; 342/450, 357, 457;
701/207, 222

[56] References Cited

U.S. PATENT DOCUMENTS

| | | | |
|---|---|---|---|
| 3,721,956 | 3/1973 | Hamann et al. | 340/65 |
| 3,824,541 | 7/1974 | Nolan | 340/65 |
| 4,814,951 | 3/1989 | Larsen | 340/432 |
| 4,980,667 | 12/1990 | Ames | 340/427 |
| 5,008,647 | 4/1991 | Brunt et al. | 340/432 |
| 5,270,681 | 12/1993 | Jack | 340/427 |
| 5,318,147 | 6/1994 | Maiefski | 340/426 |
| 5,493,268 | 2/1996 | Lewis, Sr. et al. | 340/426 |
| 5,515,419 | 5/1996 | Sheffer | 340/539 |
| 5,534,847 | 7/1996 | McGregor | 340/432 |

*Primary Examiner*—Jeffery A. Hofsass
*Assistant Examiner*—Anh La
*Attorney, Agent, or Firm*—Henderson & Sturm

[57] ABSTRACT

A bicycle theft prevention system 10 for use with bicycles 100 including an alarm unit 11 and a tracking unit 12 disposed within the framework 101 of the bicycle 100 and a time delayed marking unit 14 and temporary physical immobilizing unit 15 disposed on the exterior of the bicycle 100. A hand held tracker unit 19 may be employed to establish the location of the stolen bicycle 100.

9 Claims, 3 Drawing Sheets ns of the best mode for carrying out the invention, particularly when reviewed in conjunction with the drawings, wherein:

BICYCLE THEFT PREVENTION SYSTEM

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of

2. Description of Related Art

As can be seen by reference to the following U.S. Pat. Nos. 3,721,956; 3,824,541; 4,980,667; and 5,270,681 the prior art is replete with myriad and diverse bicycle alarm systems.

While all of the aforementioned prior art constructions are more than adequate for the basic purpose and function for which they have been specifically designed, they are uniformly deficient with respect to their failure to provide a simple, efficient and practical bicycle theft system that incorporates bicycle alarm and tracking features with a perpetrator marking and immobilizing system.

As most bicycle owners are well aware, the theft of bicycles has reached epidemic proportions and is fast approaching the top of the list of crimes that are committed in this country, representing the loss of millions of dollars annually.

As a consequence of the foregoing situation, there has existed a longstanding need for a new and improved bicycle theft prevention system that functions as both an alarm and tracking mechanism, as well as a thief marking and temporary immobilizing features, and the provision of such a construction is a stated objective of the present invention.

BRIEF SUMMARY OF THE INVENTION

Briefly stated, the bicycle theft prevention system that forms the basis of the present invention comprises in general, a tracking unit and an alarm unit which are received in a housing member contained within the framework of the bicycle and a time delayed marking unit and temporary physical immobilizing unit contained within another housing mounted on the exterior of the bicycle.

As will be explained in greater detail further on in the specification, the theft prevention system is designed to transmit both an audible and inaudible signal and after a predetermined period of time discharge both pepper spray and a marking dye on the person of the thief to assist in their apprehension.

Furthermore, the system also includes a hand held tracker unit that is responsive to the inaudible signal being generated by the tracking unit to assist the person holding the tracker unit to locate the stolen bicycle.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
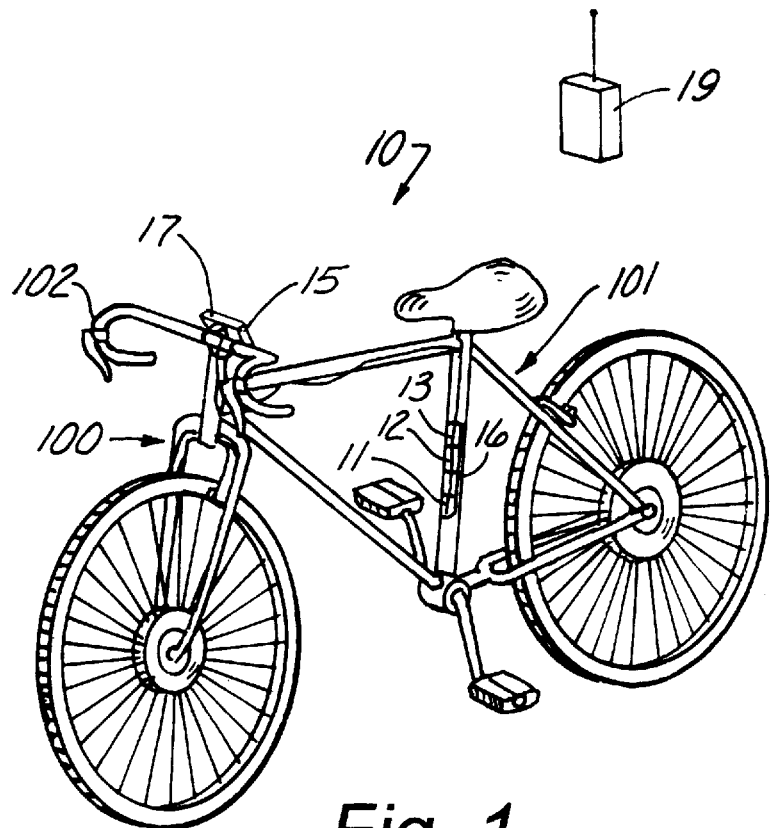
FIG. 1 is a perspective view of the bicycle theft system of this invention installed on a bicycle.

As can be seen by reference to the drawings, and in particularly to FIG. 1, the bicycle theft prevention system that forms the basis of the present invention is designated generally by the reference number 10. The system 10 comprises in general, an alarm unit 11, a tracking unit 12, a time delay unit 13, a marking unit 14, and an immobilizing unit 15 which are all operatively associated with the framework 101 of a conventional bicycle 100 and a hand held tracker unit 19 which is carried on the user's person.

Figure 2:
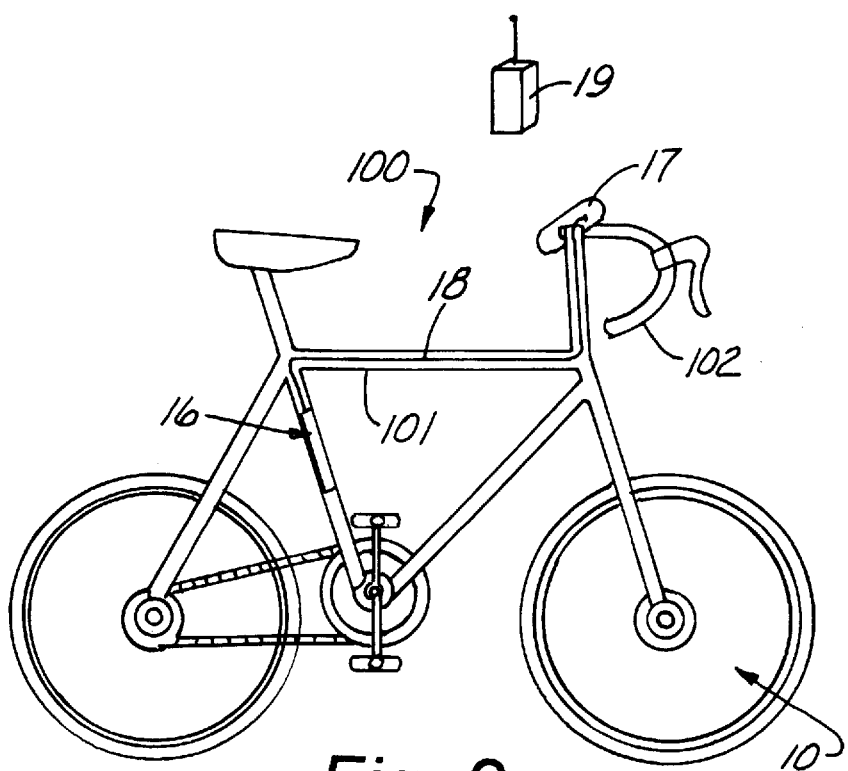
FIG. 2 is a side elevation view of a transparent bicycle illustrating the location of the primary components of the system.

As can best be seen by reference to FIGS. 1 and 2, the alarm unit 11 tracking unit 12 and time delay unit 13 are all contained in a generally tubular housing member 16 disposed within a portion of the tubular framework 101 of the bicycle 100. The marking unit 14 and immobilizing unit 15 are contained within a generally rectangular housing member 17 that is mounted on the exterior of the tubular framework 101 and in the vicinity of the bicycle handlebars 102.

Furthermore, the tubular housing member 16 is electronically connected to the generally rectangular housing member 17 via a length of electrical wire 18 which is at least partially threadedly received within the hollow tubular framework 101 of the bicycle 100. In addition, this invention also contemplates a wireless connection between the housing members 16 and 17 as will be described in greater detail further on in the specification.

Figure 3:
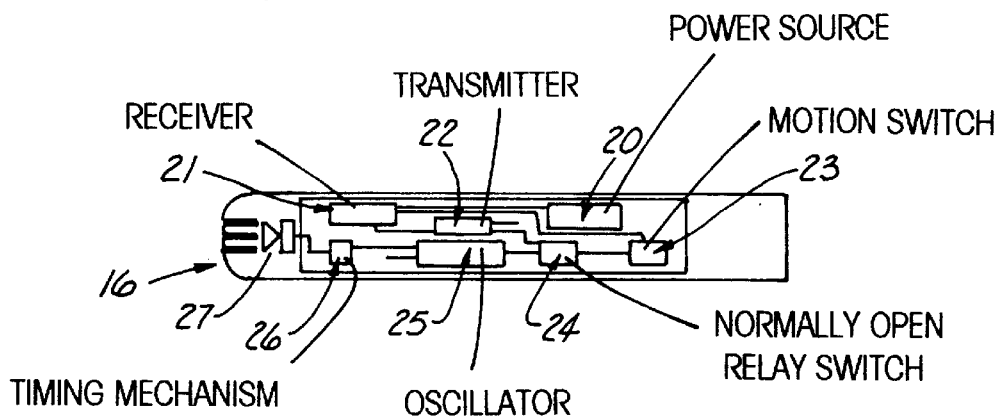
FIG. 3 is a cross sectional view through the tubular housing showing the alarm, timing and tracking units.

Turning now to FIG. 3, it can be seen that the tubular housing unit 16 contains a power source 20 which supplies electrical power to an FM receiver 21, an FM transmitter 22, a motion switch 23, a normally open relay 24, a 1 Khz oscillator 25, a timer mechanism 26, and a speaker 27. The alarm unit 11 comprises the oscillator 25 and the speaker 27, the tracking unit 12 includes the FM receiver 21 and transmitter 22 and the timing unit 13 comprises the timing mechanism 26.

Figure 4:
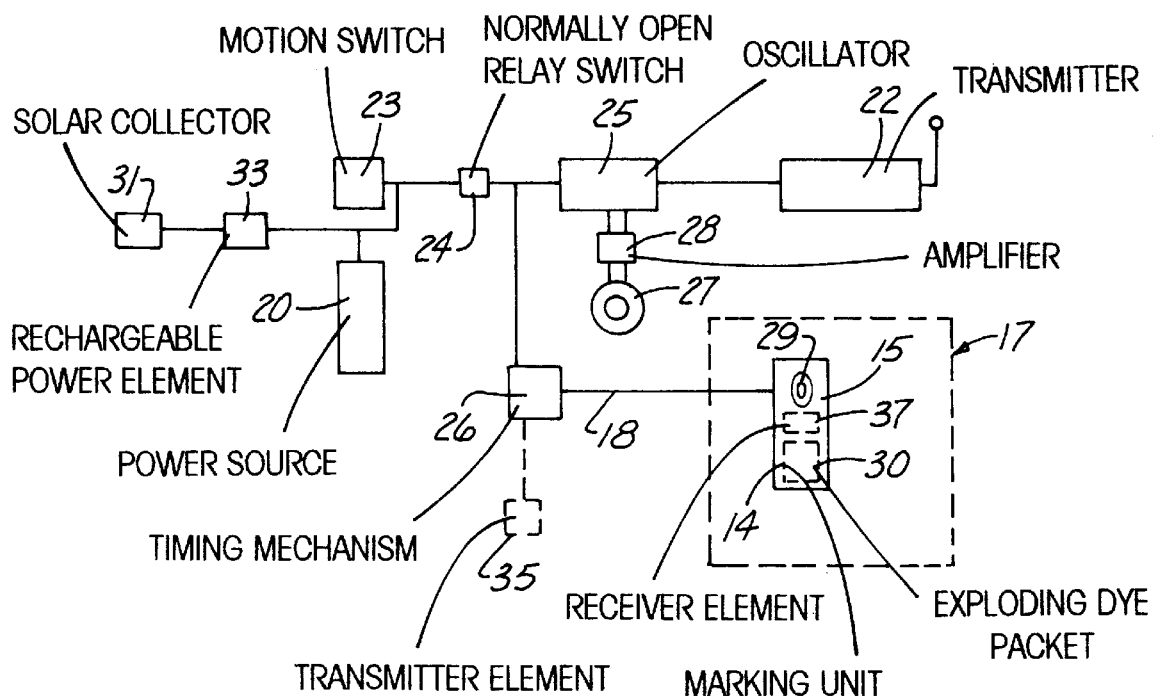
FIG. 4 is a schematic diagram of the electrical components of the system.

In the electrical schematic illustrated in FIG. 4, the power source 20 is connected to a motion switch 23 and the normally open relay switch 24 and then through the oscillator 25 to both the FM transmitter 22 and the alarm speaker 27 provided with an amplifier 28.

In addition, the power source 20 is also connected to the timing mechanism 26 which triggers the marking unit 14 and immobilizing unit 15 in the form of a pepper spray issuing from the nozzle 29 in the housing member 17 and an exploding dye packet 30.

The power source 20 may also be supplemented by a solar collector 31 and/or rechargeable power element 33. The hard wired connection 18 between the timing mechanism 26 and the marking unit 14 and immobilizing unit 15 may be replaced and/or augmented by a wireless arrangement employing a transmitter element 35 associated with the timing mechanism 26 and a receiver element 37 tuned to the transmitter element 35 and operatively associated with the marking and immobilizing units 14 and 15.

Figure 5:
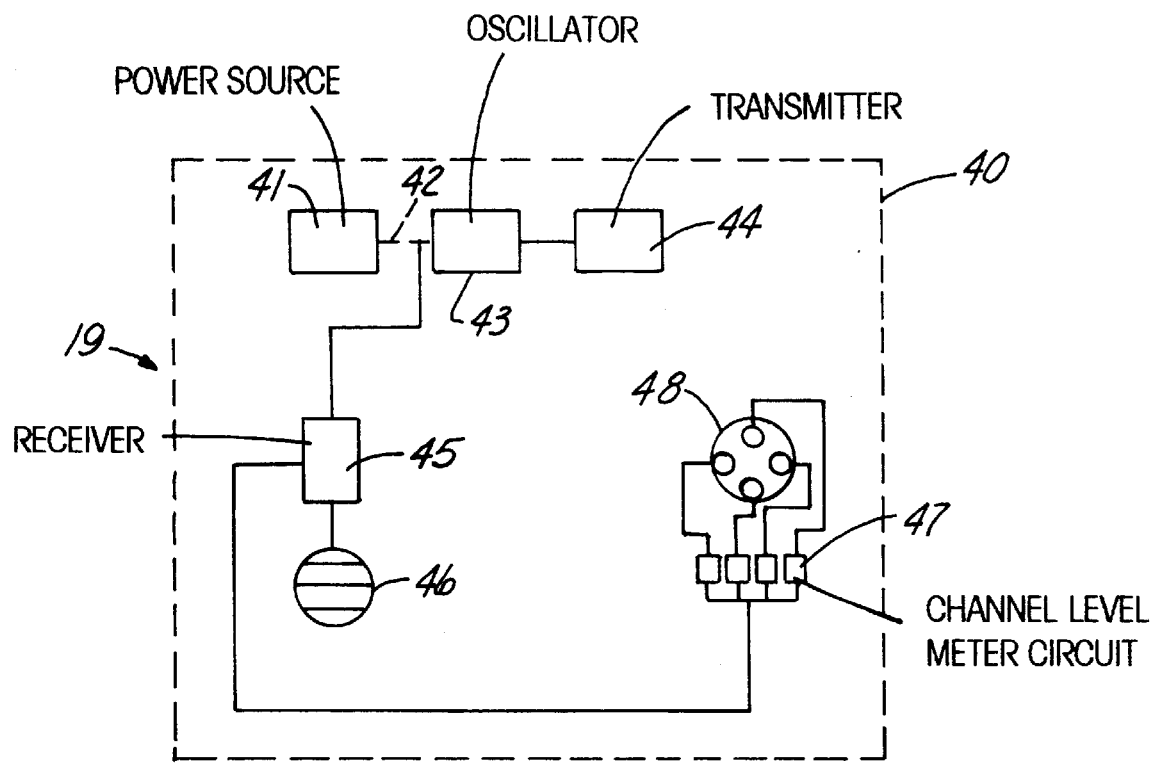
FIG. 5 is a schematic diagram of an optional hand held tracker unit.
Figure 6:
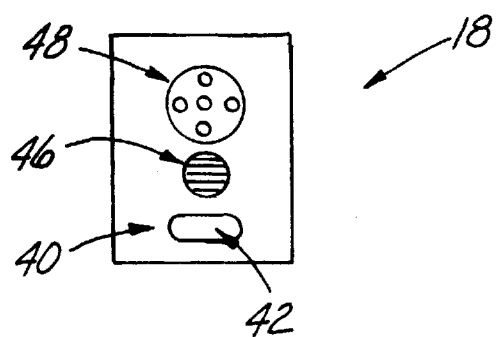
FIG. 6 is a front elevation view of the optional tracker unit.

Turning now to FIGS. 5 and 6, it can be seen that the optional hand held tracker unit 19 includes a compact housing member 40 containing a power source 41 connected to a switch 42, a 1 Khz oscillator 43, an FM transmitter 44, an FM receiver 45 having a speaker 46 and a four channel level meter circuit 47 that drives an LED array 48 in a well recognized fashion.

In operation, the user would arm the system 10 by closing the normally open relay switch 24 such that movement of the bicycle 100 would trigger the motion switch 23 to actuate both the alarm unit 11, the tracking unit 12, and the timing unit 13. The alarm unit 11 generates an audible alarm through the speaker 27 to alert people in the immediate vicinity of the bicycle 100 that an unauthorized use or theft is taking place.

In addition, the FM transmitter 22 is generating an inaudible signal that can be followed by the hand held tracker unit 19 as will be explained presently. Furthermore, the timing mechanism 26 contains a switch that will be closed after a predetermined period of time has elapsed whereupon the pepper spray and the explosive dye will be delivered in sequential fashion to both visually mark and temporarily physically immobilize the would-be thief.

It should be noted at this juncture that the placement of the alarm unit 11 and tracking unit 12 within the framework 101 of the bicycle 100 will prevent the thief from immobilizing those components. Furthermore, the marking unit 14 and immobilizing unit 15 may be designed such that any attempt to forcibly remove housing unit 17 will automatically trigger those units 14, 15.

It should further be noted that the activation of the tracking unit 11 causes the FM transmitter 22 to generate a signal that is received by the FM receiver 45 in the hand held tracker unit 19 wherein the strength and direction of the tracking unit 11 signal may be determined to pinpoint the location of at least the bicycle 100 and hopefully the marked and immobilized thief in short order.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooded parts together, whereas, a screw employs a helical surface, in the environment of fastening wooden parts, a nail and a screw may be equivalent structures.

I claim:

1. A bicycle theft prevention system for use on a bicycle wherein the theft prevention system comprises:

a first housing member dimensioned to be received within the hollow tubular framework of the bicycle and containing an alarm unit and a tracking unit;

a second housing member operatively associated with the first housing member and disposed on the exterior of the framework of the bicycle and containing first means to assist in the apprehension of a bicycle thief.

2. The theft prevention system as in claim 1 wherein said first means comprises a marking unit.

3. The theft prevention system as in claim 1 wherein said first means comprises a temporary physical immobilizing unit.

4. The theft prevention system as in claim 1 wherein said first means comprises a temporary physical immobilizing unit and a marking unit.

5. The theft prevention system as in claim 1 wherein the actuation of said first means is governed by a timing unit.

6. The theft prevention system as in claim 1 further including second means to assist in the location of the bicycle.

7. The theft prevention system as in claim 1 further comprising:

a third housing member containing second means to assist in the location of the bicycle.

8. The theft prevention system as in claim 7 wherein said third housing member is carried on the bicycle owner's person and is responsive to said tracking unit.

9. The theft prevention system as in claim 7 wherein the tracking unit in the first housing member includes a signal transmitter, and the third housing member contains a signal receiver that is responsive to said signal transmitter.

* * * * *